US008289352B2

(12) United States Patent
Vartanian et al.

(10) Patent No.: US 8,289,352 B2
(45) Date of Patent: Oct. 16, 2012

(54) PROVIDING ERASABLE PRINTING WITH NANOPARTICLES

(75) Inventors: Harry Vartanian, Philadelphia, PA (US); Jaron Jurikson-Rhodes, Philadelphia, PA (US)

(73) Assignee: HJ Laboratories, LLC, Philadelphia, PA (US)

( * ) Notice: Subject to any disclaimer, the term of this patent is extended or adjusted under 35 U.S.C. 154(b) by 203 days.

(21) Appl. No.: 12/837,170

(22) Filed: Jul. 15, 2010

(65) Prior Publication Data

US 2012/0013695 A1 Jan. 19, 2012

(51) Int. Cl.
*B41J 2/00* (2006.01)
*G02B 5/00* (2006.01)
*H04M 1/00* (2006.01)

(52) U.S. Cl. .................. 347/110; 250/505.1; 455/575.1

(58) Field of Classification Search .................. 347/110
See application file for complete search history.

(56) References Cited

U.S. PATENT DOCUMENTS

| | | | |
|---|---|---|---|
| 4,115,602 | A | 9/1978 | Bullard |
| 5,313,256 | A | 5/1994 | Bov, Jr. et al. |
| 6,045,955 | A | 4/2000 | Vincent |
| 6,284,352 | B1 | 9/2001 | Biegelsen et al. |
| 6,517,618 | B2 | 2/2003 | Foucher et al. |
| 6,670,981 | B1 | 12/2003 | Vincent et al. |
| 6,733,940 | B2 | 5/2004 | Terao et al. |
| 6,806,453 | B1 | 10/2004 | Vincent et al. |
| 6,828,786 | B2 | 12/2004 | Scherer et al. |
| 6,899,854 | B2 | 5/2005 | Darty |
| 7,027,311 | B2 | 4/2006 | Vanderelli et al. |
| 7,050,835 | B2 | 5/2006 | Hack et al. |
| 7,130,106 | B2 | 10/2006 | Cannas et al. |
| 7,432,942 | B2 | 10/2008 | Sheridon |
| 7,550,520 | B2 | 6/2009 | Daly et al. |
| 7,569,515 | B2 | 8/2009 | Takayama et al. |
| 7,608,139 | B2 | 10/2009 | Gotanda et al. |
| 7,695,811 | B2 | 4/2010 | Northen et al. |
| 7,704,658 | B2 | 4/2010 | Mishra et al. |
| 7,748,625 | B2 | 7/2010 | Kinoshita |
| 7,816,002 | B2 | 10/2010 | Matsuda et al. |
| 7,820,307 | B2 | 10/2010 | Kurihara et al. |
| 7,828,982 | B2 | 11/2010 | Full et al. |
| 2003/0017336 | A1 | 1/2003 | Gedanken et al. |
| 2004/0144575 | A1 | 7/2004 | Zloter et al. |
| 2004/0169713 | A1 | 9/2004 | Niino et al. |
| 2004/0186741 | A1 | 9/2004 | Sawada |

(Continued)

FOREIGN PATENT DOCUMENTS

CA 2053094 4/1992

(Continued)

OTHER PUBLICATIONS

"Erasable Paper Printing Technology Demonstration: Xerox", Jan. 26, 2009, http://www.youtube.com/watch?v=O-utKuhjlso.

(Continued)

*Primary Examiner* — Stephen Meier
*Assistant Examiner* — Alexander C Witkowski
(74) *Attorney, Agent, or Firm* — Volpe and Koenig, P.C.

(57) ABSTRACT

An apparatus and method for providing rewritable or erasable printing or copying that utilizes nanoparticle ink or toner is disclosed. A paper-like material is described using nanoparticles that are selectively controlled to show a substantially dark, gray, or white dot depending on an emitted signal or field in a printer or copier device. Also disclosed is a printer or copier device that erases and writes nanoparticles to a paper-like material depending on an emitted magnetic signal in a printer or copier device.

10 Claims, 6 Drawing Sheets

U.S. PATENT DOCUMENTS

| | | | |
|---|---|---|---|
| 2005/0008861 | A1 | 1/2005 | Yadav et al. |
| 2005/0223331 | A1 | 10/2005 | Wolff et al. |
| 2005/0255309 | A1 | 11/2005 | Taylor et al. |
| 2005/0274454 | A1 | 12/2005 | Extrand |
| 2006/0096392 | A1 | 5/2006 | Inkster et al. |
| 2006/0243147 | A1 | 11/2006 | Dilling |
| 2007/0076233 | A1 | 4/2007 | Lee et al. |
| 2007/0085838 | A1 | 4/2007 | Ricks et al. |
| 2007/0139391 | A1 | 6/2007 | Bischoff |
| 2007/0165094 | A1 | 7/2007 | Matsumura et al. |
| 2007/0243403 | A1 | 10/2007 | Matsuda et al. |
| 2007/0247422 | A1 | 10/2007 | Vertegaal et al. |
| 2007/0283248 | A1 | 12/2007 | Yoshida |
| 2008/0018674 | A1 | 1/2008 | Matsuda et al. |
| 2008/0080010 | A1 | 4/2008 | Korst |
| 2008/0098919 | A1 | 5/2008 | Dauer et al. |
| 2008/0146443 | A1 | 6/2008 | Matsunaga et al. |
| 2008/0152895 | A1 | 6/2008 | Law |
| 2008/0227010 | A1 | 9/2008 | Kurihara et al. |
| 2008/0280085 | A1 | 11/2008 | Livne |
| 2009/0011232 | A1 | 1/2009 | Dai et al. |
| 2009/0033914 | A1 | 2/2009 | Doublet |
| 2009/0074231 | A1 | 3/2009 | Rancien |
| 2009/0188638 | A1 | 7/2009 | Chalaye et al. |
| 2009/0200792 | A1 | 8/2009 | Iftime et al. |
| 2009/0258200 | A1 | 10/2009 | Scholz et al. |
| 2009/0270558 | A1 | 10/2009 | Gandon-pain et al. |
| 2009/0321676 | A1 | 12/2009 | Breton et al. |
| 2009/0324289 | A1 | 12/2009 | Fan et al. |
| 2010/0035224 | A1 | 2/2010 | Minard |
| 2010/0050619 | A1 | 3/2010 | Colvin et al. |
| 2010/0086867 | A1 | 4/2010 | Iftime et al. |
| 2010/0091306 | A1 | 4/2010 | Ramsey |
| 2010/0134583 | A1 | 6/2010 | Koroishi et al. |
| 2010/0156615 | A1 | 6/2010 | Ochiai et al. |

FOREIGN PATENT DOCUMENTS

| | | | |
|---|---|---|---|
| CN | 2199564 | Y | 5/1995 |
| CN | 2530807 | Y | 1/2003 |
| CN | 1530234 | A | 9/2004 |
| CN | 2754877 | Y | 2/2006 |
| CN | 201009583 | Y | 1/2008 |
| CN | 101285286 | A | 10/2008 |
| CN | 101382689 | B | 6/2010 |
| JP | 6093564 | A2 | 4/1994 |
| JP | 6171284 | A2 | 6/1994 |
| JP | 2004001258 | A2 | 1/2004 |
| JP | 2005030872 | A2 | 2/2005 |
| JP | 2005273023 | A2 | 10/2005 |
| JP | 4508674 | B2 | 7/2010 |
| JP | 4508675 | B2 | 7/2010 |
| JP | 4525088 | B2 | 8/2010 |
| KR | 20030055228 | A | 7/2003 |
| KR | 100753487 | B1 | 8/2007 |

OTHER PUBLICATIONS

"Toshiba B-SX8R Rewritable Printer Demo", Nov. 26, 2006, http://www.youtube.com/watch?v=yKBKPGdkjK0.

"LED Printer Learning Center", Publication date unkown.

Blum, John B., "Ink jet printing for high-frequency electronic applications: nanoparticle inks and drop-on demand ink jet printers offer a unique opportunity to generate fine-line additive circuits on flexible, three-dimensional substrates." Printed Circuit Design & Fab, Oct. 1, 2007.

Harris, Tom, "How Laser Printers Work", HowStuffWorks, Publication date prior to Apr. 29, 2010.

Gleiche, Michael; Hoffschulz, Holger; Lenhert, Steve; "Nanotechnology in Consumer Products" Nanoforum Report, Oct. 2006, Nanoforum, European Nanotechnology Gateway.

"RP-3100 Prepeat", Published before Apr. 29, 2010, Sanwa Newtec Co.

Fearing, Ronald, "Smart Gecko Tape", Published before Apr. 26, 2010, University of California, Berkeley, USA.

Author Unknown, "Nanotechnology Enables First Synthetic Reversible Gecko Glue, Magnetism Turns Dry Micro-Nano Adhesive On and Off", Nano Patents and Innovations, Apr. 14, 2010, IRAP, Inc.

Patel, Prachi,"Glue with an On-and-Off Switch", Technology Review, Jul. 31, 2007, MIT.

Hallock, Marilyn F., et al. "Potential Risks of Nanomaterials and How to Safely Handle Materials of Uncertain Toxicity", Journal of Chemical Health and Safety, Jan.-Feb. 2009, pp. 16-23, vol. 16, Issue 1, Elsevier B.V.

Wang, Zhong Lin, "Sticky but not messy", Nature Nanotechnology, Jul. 2009, pp. 407-408, vol. 4, Macmillan Publishers Limited.

Greene, Kate, "Printing without Ink", Technology Review, Feb. 8, 2007, MIT.

Paul, D.R.; Robeson, L.M.; "Polymer nanotechnology: Nanocomposites", Polymer, Apr. 13, 2008, pp. 3187-3204, vol. 49, Elsevier Ltd.

Sun, Johnathan, "Switching a nanomagnet is all in the timing", Physics, Nov. 3, 2008, Physics 1, 33, American Physical Society.

Author Unknown, "Nanomagnets bend the rules", Published prior to Apr. 21, 2010, NC&T/NIST.

Author Unknown, "Tutorial in Nanomaterials", Published prior to Apr. 21, 2010, Sigma-Aldrich.

Coughlin, Dan; Gilbert, Paul; Masia, Steven; Roper Tety, "Nanotechnology and the paper/forest product industry", Published prior to filing, Sappi.

Hattori et al., "Development of Rewritable Paper and Print System", Ricoh Technical Report No. 28, Dec. 2002, pp. 125 to 129.

PROVIDING ERASABLE PRINTING WITH NANOPARTICLES

FIELD OF INVENTION

This application relates to printing or copying. In particular it relates to providing rewritable or erasable printing or copying using nanoparticle technology.

BACKGROUND

With significant technological advances, the laser printer, inkjet printer, and copy machine in the home or office have become affordable and ubiquitous. As printing or copying technology has improved and become further utilized, the costs of paper and ink or toner have also reduced substantially. As a product of lower cost, the volume of printing or copying has increased to a point where many sheets of paper are wasted unnecessarily on a daily basis. In fact, recent studies have shown that printed or copied papers are typically used for only a few hours before disposal. Although the cost of paper and ink or toner have become reasonable it is not negligible with the increase of printing or copying volume. In addition, continuous disposal of paper creates waste.

Inkless printing technologies such as the thermal printer have attempted to address the problem of increased paper waste and ink or toner cost. However, the thermal paper used by a thermal printer cannot typically be reused and print outs can degrade quickly over time due to ambient heat.

The rate of advances in nanotechnology is increasing. As scientists understand more about materials on a molecular scale they are able to control and leverage them to develop new applications. However, the use of nanotechnology to improve the paper printer or copier has been largely ignored. It is desirable to use nanotechnology to provide a rewritable or erasable printer or copier device thereby reducing waste and ink or toner expenses.

SUMMARY

An apparatus and method for providing rewritable or erasable printing or copying that utilizes nanoparticle ink or toner is disclosed. A paper-like material is described using nanoparticles that are selectively controlled to show a substantially dark, gray, or white dot depending on an emitted signal or field in a printer or copier device. Also disclosed is a printer or copier device that erases and writes nanoparticles to a paper-like material depending on an emitted magnetic signal in a printer or copier device.

BRIEF DESCRIPTION OF THE DRAWINGS

A more detailed understanding may be had from the following description, given by way of example in conjunction with the accompanying drawings wherein.

DETAILED DESCRIPTION

Figure 1:
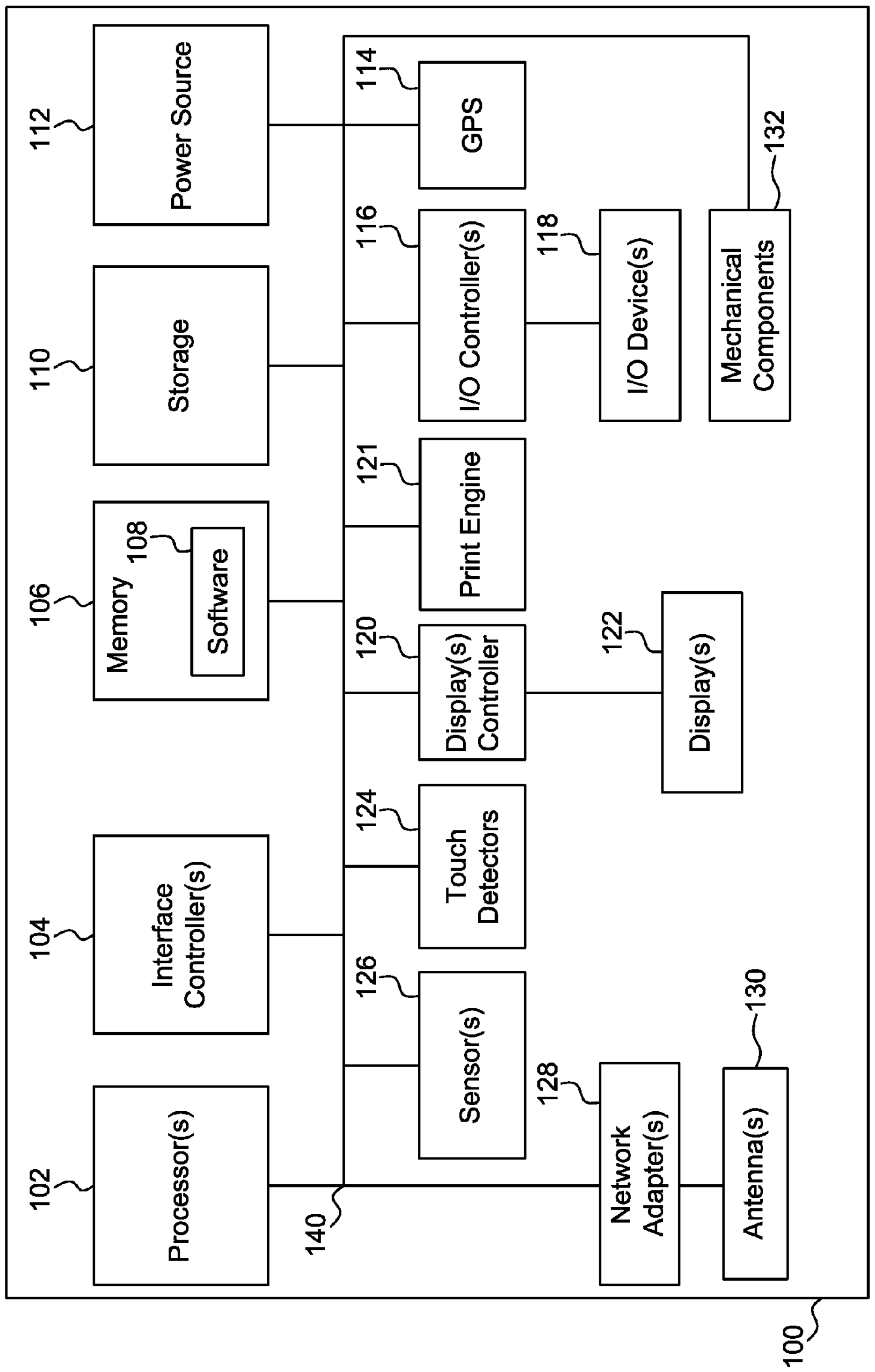
FIG. 1 is a diagram of a printer or copier computer device in accordance with one embodiment.

The present invention will be described with reference to the drawing figures wherein like numerals represent like elements throughout. For the processes described below the steps recited may be performed out of sequence and sub-steps not explicitly described or shown may be performed. In addition, "coupled" or "operatively coupled" may mean that objects are linked between zero or more intermediate objects.

In the details given below, nanoparticle ink or toner is utilized to provide the reuse of ordinary paper, plain paper, and/or paper-like material. For instance, special paper-like material imbedded with nanoparticle ink or toner may repeatedly be used in a printer or copier device where with each print or copy an emitted signal or field selectively makes sections of the paper appear substantially opaque or transparent in certain patterns.

As another example, ordinary paper or paper-like material may be substantially uniformly applied, sprayed, or treated with nanoparticle ink or toner as it passes through a printer or copier device an initial time such that during current or future prints a signal or field selectively makes sections of the ink or toner appear substantially opaque or transparent. Moreover, ordinary paper or paper-like material may be printed with nanoparticle ink or toner during a current print out, which, upon a future print, is transformed substantially transparent to allow a new layer of opaque nanoparticle ink or toner to be printed over it.

As another example, nanoparticle ink or toner may be initially printed on ordinary paper or paper-like material by a printer or copier, where the nanoparticle ink or toner is subsequently substantially removed during future prints to allow new prints. For this example the removed nanoparticle ink may be reapplied or reused after removal during the current or future print.

FIG. 1 is a diagram of a printer or copier computer device 100 in accordance with one embodiment. Printer or copier computer device 100 may be part of or made integral with another computing device, a surface computer, a tablet computer, a monitor, a general display, a versatile device, an automobile computer system, a vehicle computer system, a television, a mobile user station or a portable user station. Device 100 comprises computer bus 140 that couples at least one or more processors 102, one or more interface controllers 104, memory 106 having software 108, storage device 110, power source 112, and/or one or more displays controller 120.

Device 100 also comprises print or copy engine 121 for providing printing services. Print or copy engine 121 comprises hardware and software components for providing printing services in conjunction with mechanical components 132.

One or more display devices 122 can be configured as a liquid crystal display (LCD), light emitting diode (LED), field emission display (FED), organic light emitting diode (OLED), or flexible OLED display device. The one or more display devices 122 may be configured, manufactured, produced, or assembled based on the descriptions provided in US Patent Publication Nos. 2007-247422, 2007-139391, 2007-085838, or 2006-096392 or U.S. Pat. No. 7,050,835 or WO Publication 2007-012899 all herein incorporated by reference as if fully set forth. In the case of a flexible display device, the one or more electronic display devices 122 may be configured and assembled using organic light emitting diodes (OLED), liquid crystal displays using flexible substrate technology, flexible transistors, or field emission displays (FED) using flexible substrate technology, as desired. One or more display devices 122 may be configured as a touch or multi-touch screen display using resistive, capacitive, surface-acoustic wave (SAW) capacitive, infrared, strain gauge, optical imaging, dispersive signal technology, acoustic pulse recognition, frustrated total internal reflection or magnetostrictive technology, as understood by one of ordinary skill in the art.

Coupled to computer bus 140 are one or more input/output (I/O) controller 116, I/O devices 118, GPS device 114, one or more network adapters 128, and/or one or more antennas 130. The one or more network adapters 128 may be configured to receive print jobs from a remote computer such as for cloud based printing. Device 100 may have one or more motion, proximity, light, optical, chemical, environmental, moisture, acoustic, heat, temperature, radio frequency identification (RFID), biometric, face recognition, image, photo, or voice recognition sensors 126 and touch detectors 124 for detecting any touch inputs, including multi-touch inputs, for one or more display devices 122. One or more interface controllers 104 may communicate with touch detectors 124 and I/O controller 116 for determining user inputs to device 100.

Still referring to device 100, storage device 110 may be any disk based or solid state memory device for storing data. Power source 112 may be a plug-in, battery, solar panels for receiving and storing solar energy, or a device for receiving and storing wireless power as described in U.S. Pat. No. 7,027,311 herein incorporated by reference as if fully set forth. One or more network adapters 128 may be configured as a Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Enhanced Data rates for GSM Evolution (EDGE), General Packet Radio Service (GPRS), cdma2000, wideband CDMA (W-CDMA), long term evolution (LTE), 802.11x, Wi-Max, mobile Wi-MAX, Bluetooth, or any other wireless or wired transceiver for modulating and demodulating information communicated via one or more antennas 130. Additionally, any of devices, controllers, displays, components, etc. in device 100 may be combined, made integral, or separated as desired.

Figure 2A:
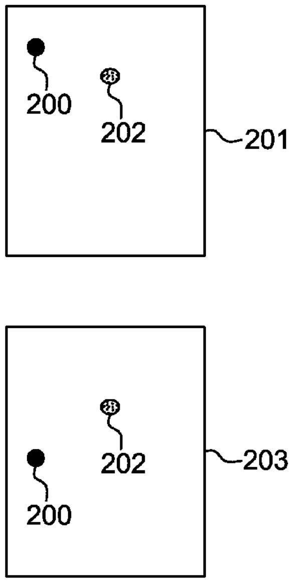
FIG. 2*a* is a diagram of a paper-like material having controllable nanoparticle ink or toner in accordance with another embodiment.

FIG. 2*a* is a diagram of a sheet of paper-like material 201 composed of in part controllable nanoparticle ink or toner in accordance with another embodiment. Examples of paper-like material include primarily or mixtures of wood fibers, wood by-products, lignin, plant fibers, chalk, clay, linen, cotton, cellulose fibers, latex, polyolefine, or plain paper composite materials, as desired. The nanoparticle ink or toner may be in part composed of nanomagnets, such as ferromagnets, for use by the nanoprinter that may be provided during the production of paper-like material 201. Examples of ferromagnetic materials include iron, cobalt, nickel, silver, or copper. Alternatively material 201 or 203 forthcoming, may be composed of any nanoparticles, nanotubes, nanofibers, nanodots, nanocrystals, nanowires, or nanocomposites that may be controlled or manipulated by magnetic fields, electric fields, electromagnetic fields, varying voltage levels, varying current levels, chemically, or a chemical reaction to produce a substantially dark dot and reversibly turn the substantially dark dot to a substantially lighter or white dot. An example of controlling is changing the orientation, position, or state of a nanoparticle using a control signal or field.

As explained in the article "Switching a nanomagnet is all in the timing" by Jonathan Sun and "Nanomagnets bend the rules", both herein incorporated by reference as if fully set forth, ferromagnetic materials become magnetic when exposed to a magnetic field or electric current. With a magnetic field control, as the strength of the external field increases, the materials become more magnetic by a process called magnetic saturation. When the magnetic field is removed, ferromagnets undergo an internal restructuring and the acquired magnetization decays, or fades, very slowly at a rate that increases with temperature. When controlling a ferromagnet with current, a torque is induced on the ferromagnetic moment. This effect is referred to as a spin-transfer torque and it controls the magnetic properties of the ferromagnet.

As another example, a sheet of paper-like material 203 is composed of in part controllable nanoparticle ink or toner that is applied, sprayed, or treated during an initial printing or copying process. Since the nanoparticle ink or toner is applied, sprayed, or treated, at a printing or copying device, paper-like material 203 may not have to be specially processed, pretreated, or manufactured at a facility. Once the nanoparticle ink or toner is provided to the paper-like material it may be erased by changing the orientation of the nanoparticles in the paper-like material to show a substantially transparent or white dot. The same piece of paper may then be rewritten on by applying new nanoparticle ink or toner by a head device. Alternatively, the nanoparticle ink or toner may be erased by changing the orientation of the nanoparticles in the paper-like material to show a substantially white dot and then the same nanoparticle ink or toner is used to rewrite by changing the orientation to a substantially darker or black dot. As a result of providing the nanoparticle ink or toner at the print or copy device, this allows erasable or rewritable printing or copying with nanoparticles using a plain, ordinary, or regular paper-like material 203.

Figure 2B:
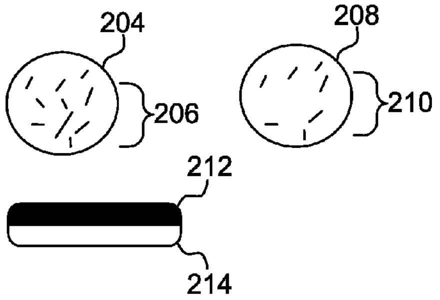
FIG. 2*b* is a detailed view of a controllable nanoparticle ink or toner in accordance with another embodiment.

In FIG. 2*a*, visible substantially black dot 200 is composed of a plurality of nanoparticles orientated in such a way to show a visible substantially black dot 200. Substantially gray dot 202 is composed of a plurality of nanoparticles orientated in such a way to show a visible substantially gray dot 202. FIG. 2*b* is an illustration at a magnified scale of a plurality of nanoparticles. In FIG. 2*b*, a visible substantially black dot 204 is shown at a smaller scale where a plurality of nanoparticles 206 are orientated in such a way to show the visible substantially black dot. Visible substantially gray dot 208 shows a lesser amount of a plurality of nanoparticles 210 orientated in such a way to show the visible substantially gray dot. Moreover, an individual nanoparticle is shown having a substantially dark side 212 and a lighter side 214. To perform an erase operation, a substantially white dot is produced on paper-like material 201 by orienting the plurality of nanoparticles collectively in such a way to mostly show lighter side 214.

Figure 2C:
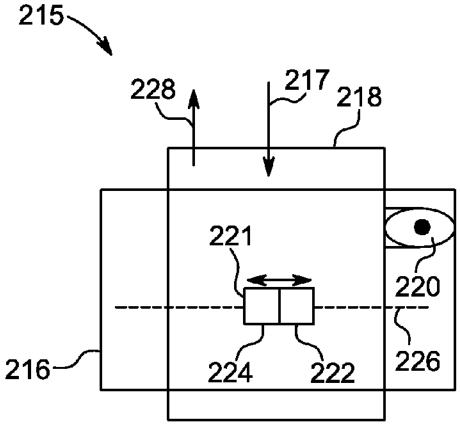
FIG. 2*c* is diagram of printer or copier device for writing, erasing, or rewriting information on a paper-like material having controllable nanoparticle ink or toner in accordance with another embodiment.

FIG. 2*c* is diagram of printer or copier device 215 for writing, erasing, or rewriting information on a paper-like material having controllable nanoparticle ink or toner in accordance with another embodiment. A benefit of device 215 is to provide printing that is environmentally friendly since it does not generate much paper or toner or ink waste. Paper-like material 218, composed of in part controllable nanoparticle ink or toner, is fed by roller 220 into housing 216 in direction 217. Printer or copier device 215 may detect if paper-like material 218 already has printed or copied content and may dewrinkle or smooth the paper-like material 218 using heat and/or a straight edge press.

Printer or copier head 221 comprises of writing, erasing, or rewriting device 222 and optical device 224. As the printer or copier head 221 moves laterally or horizontally on axis or track 226, writing, erasing, or rewriting device 222 creates or erases dots 200 or 202 line by line or pattern by pattern on paper-like material 218. Dots 200 or 202 are created or erased by altering the orientation of the nanoparticle ink or toner by emitting a signal or field to show a visible substantially black, gray, or white dot. Writing, erasing, or rewriting device 222 is controlled at least in part by software 108, print or copy engine 121, or sensors 126. Optical device 224 may provide feedback to writing, erasing, or rewriting device 222 by detecting the lightness or darkness of a dot or pattern to determine if a desired write, erase, or rewrite operation was successful after orientating the nanoparticles for one or more dots.

Figure 2D:
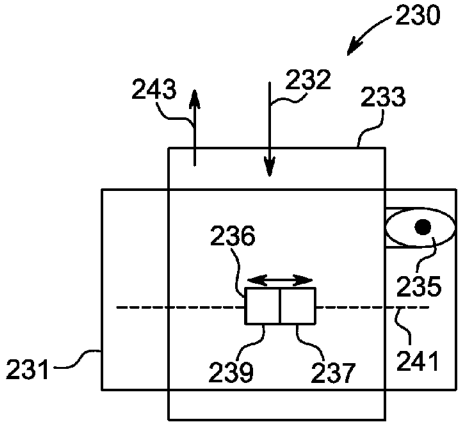
FIG. 2*d* is diagram of printer or copier device for writing, erasing, or rewriting information on an ordinary paper-like material having controllable nanoparticle ink or toner in accordance with another embodiment.

FIG. 2*d* is diagram of printer or copier device 230 for writing, erasing, or rewriting information on ordinary paper-like material having controllable nanoparticle ink or toner in accordance with another embodiment. A benefit of device 230 is to provide printing that is environmentally friendly since it does not generate much paper waste. Ordinary paper-like material 233 is fed by roller 235 into housing 231 in direction 232. Printer or copier device 230 may detect if paper-like material 233 already has printed or copied content and may dewrinkle or smooth the paper-like material 233 using heat and/or a straight edge press as a result.

Printer or copier head 236 comprises of writing, erasing, or rewriting device 237 and optical device 239. As the printer or copier head 236 moves laterally or horizontally on axis or track 241, writing, erasing, or rewriting device 237 creates dots 200 or 202 line by line or pattern by pattern on paper-like material 233. Dots are created by applying, spraying, or treating by device 237 nanoparticle ink or toner to ordinary paper-like material 233 to show a visible substantially black or gray dot. Writing, erasing, or rewriting device 237 is controlled at least in part by software 108, print or copy engine 121, or sensors 126.

Optical device 239 may provide feedback to writing, erasing, or rewriting device 237 by detecting if ordinary paper-like material 233 already has printed or copied nanoparticle ink or toner. If optical device 239 detects content on ordinary paper-like material 233, writing, erasing, or rewriting device 237 erases the content by changing the orientation of the existing nanoparticles by emitting a signal or field to show a substantially white dot and rewrites new content by applying new nanoparticle ink or toner by device 237. The erasing or rewriting operation may be performed line by line, pattern by pattern, or dot by dot. Alternatively, writing, erasing, or rewriting device 237 erases and then rewrites content by altering the orientation of the existing nanoparticle ink or toner by emitting a signal or field on the ordinary paper-like material 233 to show a visible substantially black, gray, or white dot.

Referring again to FIGS. 2*c* and 2*d*, device 215 or 230 may be configured to stop a print or copy job in progress if there is a change in the print or copy request, such as a canceled or altered job, and erase or alter any content on paper-like material 218 or 233 with writing, erasing, or rewriting device 222 or 237 by reversing the feed direction 228 or 243.

Figure 3B:
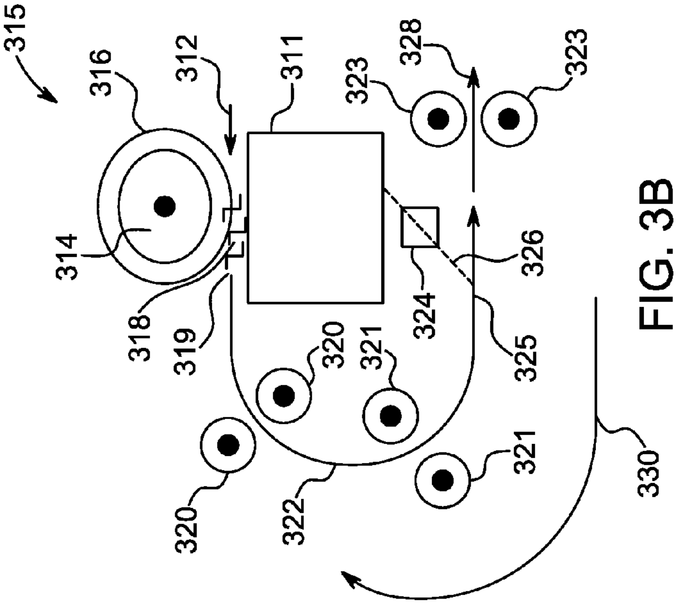
FIG. 3*b* is a diagram of a printer or copier device that writes, erases, or rewrites nanoparticle ink or toner to a paper-like material in accordance with another embodiment.
Figure 3D:
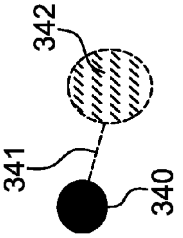
FIG. 3*d* is a detailed view of magnetically controllable nanoparticle molecular bonding in accordance with another embodiment.
Figure 3A:
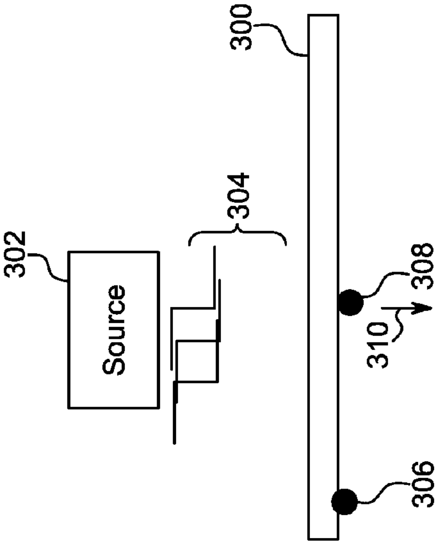
FIG. 3*a* is a diagram showing a magnetically controllable nanoparticle ink or toner in accordance with another embodiment.

FIG. 3*a* is a diagram showing a magnetically controllable nanoparticle ink or toner in accordance with another embodiment. Source device 302 provides or emits a magnetic field 304 to paper-like material 300. Magnetic field 304 causes nanoparticle 308 to be released 310 from paper-like material 300. Nanoparticle 306 outside of magnetic field 304 stays attached to paper-like material 300.

FIG. 3*b* is a diagram of a printer or copier device 315 that writes, erases, or rewrites nanoparticle ink or toner to a paper-like material in accordance with another embodiment. Paper-like material is fed via path 312 by roller 314. Printer or copier device 315 may detect if paper-like material fed via path 312 already has printed or copied content and may dewrinkle or smooth the paper-like material using heat and/or a straight edge press as a result.

As paper-like material passes through path 312, roller 314 acts in part as a nanomagnetic drum by layer 316 applying or emitting a magnetic field. As magnetic field 318 is applied, if the paper-like material is not blank any nanoparticles on the paper-like material are released into collector or hopper 311 for later reuse and the information on paper-like material is erased as it emerges 319. The ability of a nanoparticle to attach and release from a surface is explained in U.S. Pat. No. 7,695,811, herein incorporated by reference as if fully set forth.

The substantially blank paper-like material is passed through path 322 by rollers 320 and 321. As it traverses to point 325, printer/copier head or applicator 324 on track 326 applies or bonds nanoparticles from collector and hopper 311 to the paper-like material to produce a substantially dark or gray dot. As an example, applying may be performed by a spraying process similar to that used by inkjet printers. The writing or rewriting operation by printer/copier head or applicator 324 may be performed line by line, pattern by pattern, or dot by dot. Printer/copier head or applicator 324 is controlled at least in part by software 108, print or copy engine 121, or sensors 126. The printed material emerges at point 328 via rollers 323. Device 315 may be configured to stop a print or copy job in progress if there is a change in the print or copy request, such as a canceled or altered job, and erase or alter any content on a paper-like material with printer/copier head or applicator 324 by reversing the feed direction 330.

The erasing procedures given above may be performed line by line, pattern by pattern, or dot by dot followed by a rewrite operation. However, devices 215, 230, and 315 may be configured to first erase any information on a whole sheet of paper-like material by either changing the orientation of the nanoparticle ink or toner or removing the nanoparticle ink or toner prior to rewriting. Thus, complete erasure may be performed prior to rewriting information on the paper-like material. This may be performed by feeding the whole sheet of paper-like material all the way through the printer or copier device then reversibly feeding back the paper-like material to a write or rewrite position.

In addition, example devices given in FIGS. 2*c*, 2*d*, and 3*b* may be configured and integrated with a 3D printing, 3D manufacturing, or rapid prototyping device. FIGS. 2*c*, 2*d*, and 3*b* may also be configured for two sided printing or copying. In the example devices given in FIGS. 2*c*, 2*d*, and 3*b*, different components may be combined in order to provide rewritable or erasable printing or copying. For instance, printer or copier device 215 may be configured with a roller stage to magnetically remove any nanoparticles on a paper-like material by printer or copier device 315. Alternatively, printer or copier device 315 may be configured with a print or copy stage to alter any content produced on paper-like material by device 215.

Although the examples given in FIGS. 2*c* and 2*d* are for black and white or grayscale printing or copying, one of ordinary skill in the art may extend the examples to color by having paper-like material composed of nanoparticles of different colors or colorants that appear and disappear based on orientation. Similarly, device 315 may be configured to remove nanoparticles of different colors, separate the nanoparticles of different colors, and then apply or reapply the nanoparticles of different colors.

Figure 3C:
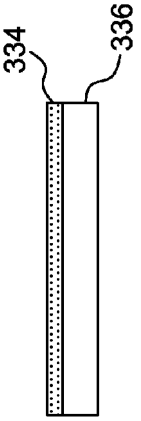
FIG. 3*c* is a diagram of paper-like material for use with a magnetically controllable nanoparticle ink or toner in accordance with another embodiment.

FIG. 3*c* is a diagram of paper-like material for use with a magnetically controllable nanoparticle ink or toner in accordance with another embodiment. In this embodiment a paper-like material may be composed of primarily or mixtures of wood fibers, wood by-products, lignin, plant fibers, chalk, clay, linen, cotton, cellulose fibers, latex, polyolefine, or plain paper composite materials in layer 336. Applied or bonded nanoparticles are provided to a special layer 334. Layer 336 and special layer 334 may be substantially separate or slightly mixed, as desired.

FIG. 3*d* is a detailed view of magnetically controllable nanoparticle ink or toner molecular bonding in accordance with another embodiment. In a steady state nanoparticle 340 is bonded to paper-like material 342. When a magnetic field is applied or emitted, bond 341 is broken and nanoparticle 340 is released. Depending on the composition and type of the nanoparticle, the breaking of the bond may be reactive to a magnetic field strength of a particular value or range.

Figure 4:
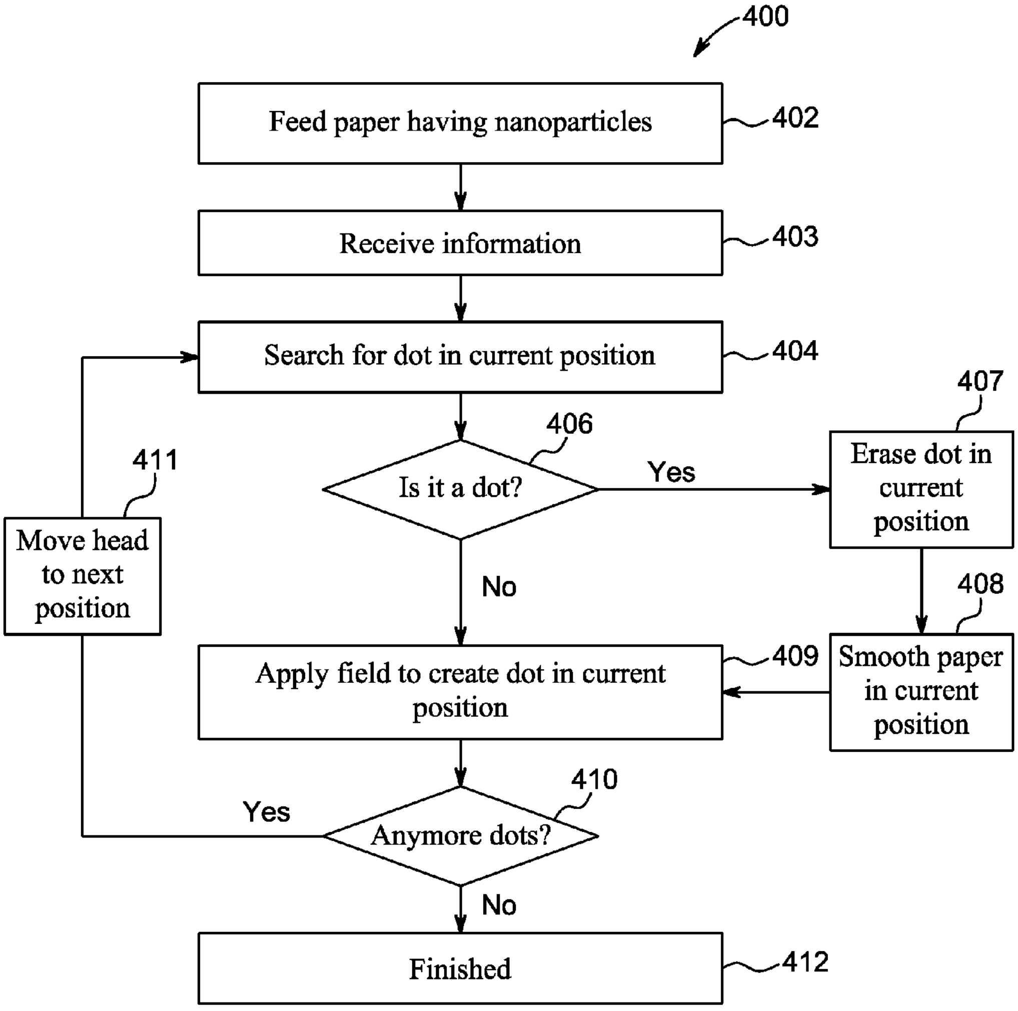
FIG. 4 is a process to write, erase, or rewrite information on a paper-like material having controllable nanoparticle ink or toner in accordance with another embodiment.

FIG. 4 is a process 400 to write, erase, or rewrite information on a paper-like material having controllable nanoparticle ink or toner in accordance with another embodiment. Paper-like material having nanoparticle ink or toner is fed (step 402). Print or copy information is received from software 108, print or copy engine 121, or sensors 126 (step 403). A dot is searched for in a current position by optical device 224 (step 404). If a dot is detected (step 406), the dot in the current position is erased (step 407) by emitting a signal or field by a printer or copier head to change the orientation of nanoparticles at the current position to show a substantially white or transparent dot. The paper-like material in the current position may then be smoothed or dewrinkled, if necessary, in order to ensure a like new surface look (step 408). A signal or field is then applied to create a dot in the current position (step 409).

If a dot is not detected (step 406), a signal or field is then applied to create a dot in the current position (step 409) to change the orientation of nanoparticles at the current position to show a substantially dark or gray dot. If there are anymore dots to print or copy (step 410 and 411), the printer or copier head is moved to the next position and the process is repeated as information is printed or copied line by line, pattern by pattern, or dot by dot. If not, the print or copy operation is finished (step 412).

Figure 5:
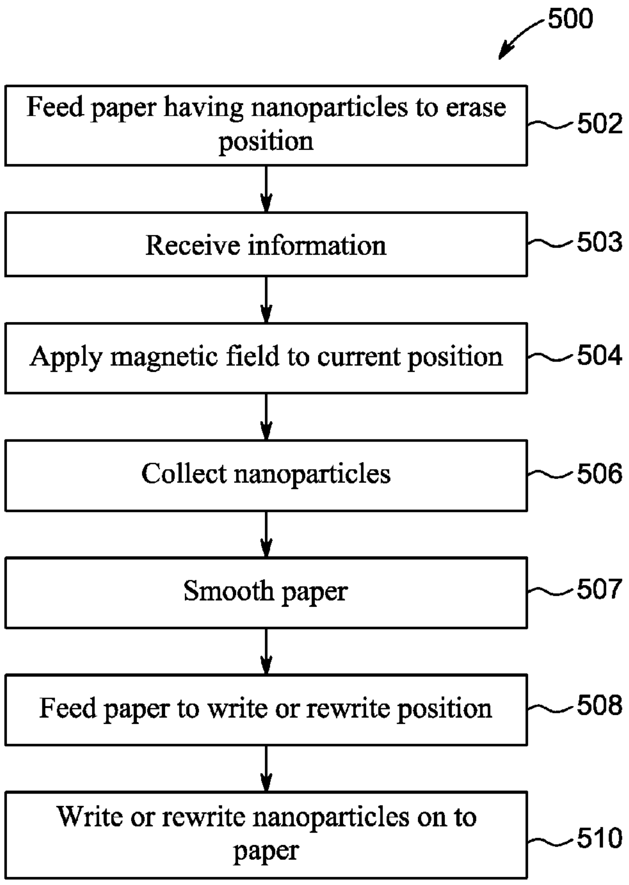
FIG. 5 is a process to write, erase, or rewrite nanoparticle ink or toner to a paper-like material in accordance with another embodiment.

FIG. 5 is a process 500 to write, erase, or rewrite nanoparticle ink or toner to a paper-like material in accordance with another embodiment. Paper-like material having nanoparticles is fed to an erase position (step 502). Print or copy information is received from software 108, print or copy engine 121, or sensors 126 (step 503). A magnetic field is applied or emitted to the current position (step 504). The nanoparticles at the current position are collected if the paper-like material is not completely blank (step 506). The paper-like material may then be smoothed or dewrinkled if necessary (step 507). The paper is subsequently fed to the print/copy write/rewrite position (step 508). The same or different nanoparticles are then printed or copied by writing or rewriting onto the paper (step 510) dot by dot, line by line, or pattern by pattern by a head or applicator.

Figure 6:
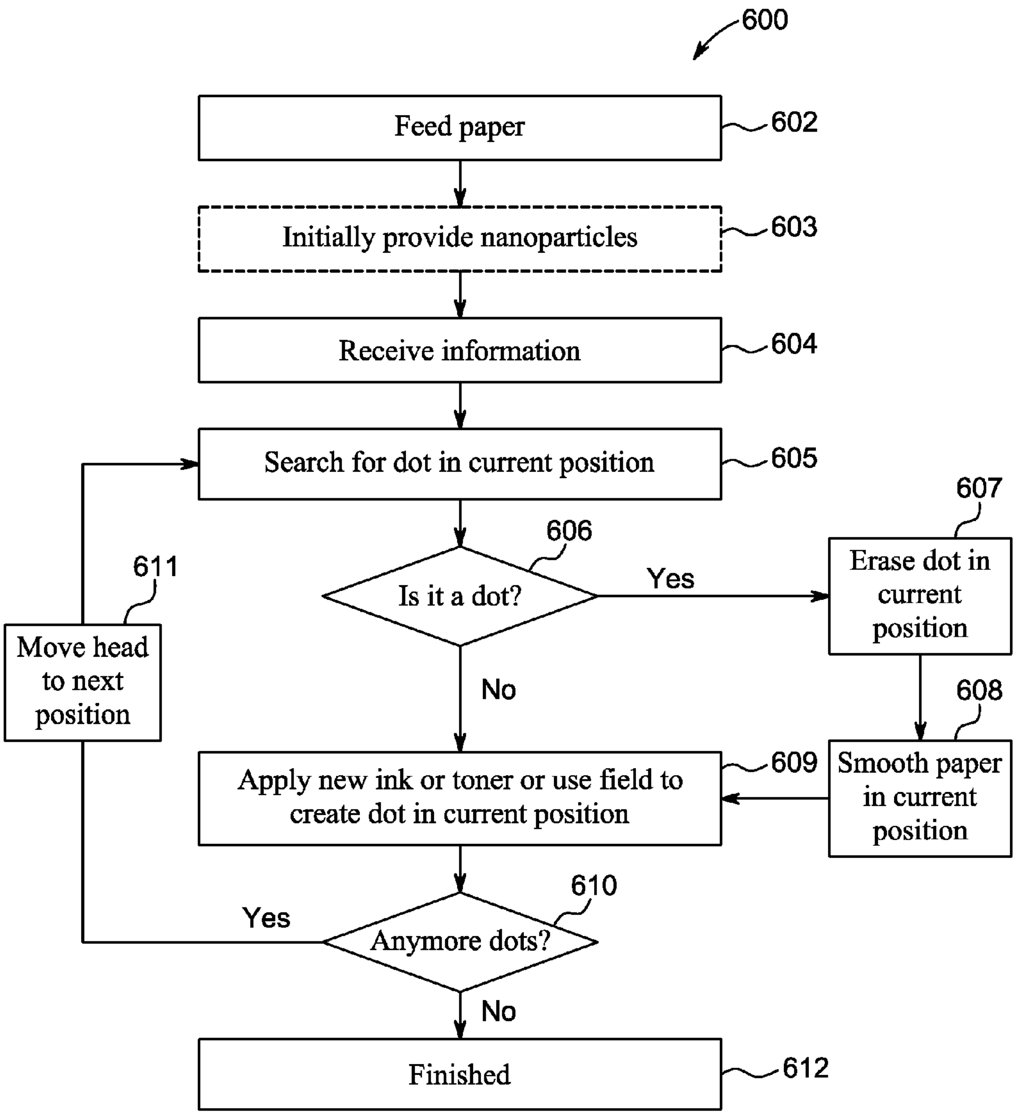
FIG. 6 is a process to write, erase, or rewrite information on an ordinary paper-like material having controllable nanoparticle ink or toner in accordance with another embodiment.

FIG. 6 is a process 600 to write, erase, or rewrite information on an ordinary paper-like material having controllable nanoparticle ink or toner in accordance with another embodiment. Ordinary or plain paper-like material is fed (step 602) to a first position. Optionally, if the ordinary or plain paper-like material does not have any nanoparticle ink or toner, it is applied, sprayed, or treated with nanoparticle ink or toner, such as by a head device, by an initial complete pass through the printer or copier device and then may be reversibly fed to the first position (step 603).

Print or copy information is received from software 108, print or copy engine 121, or sensors 126 (step 604). A dot may be searched for in a current position by optical device 224 (step 605). If a dot is detected (step 606), the dot in the current position is erased (step 607). Alternatively if a dot is detected an erase procedure may be performed on the entire sheet of paper-like material by a complete pass through the printer or copier device and then the paper-like material is reverse fed to the current position. An erase operation may be performed by emitting a signal or field by a printer or copier head to change the orientation of nanoparticles to show a substantially white or transparent dot.

The paper-like material in the current position may then be smoothed or dewrinkled, if necessary, in order to ensure a like new surface look (step 608). New nanoparticle ink or toner is applied, sprayed, or treated to the ordinary paper-like material in the first position (step 609). Alternatively, if step 603 is performed a signal or field is applied to create a dot in the current position using existing nanoparticle ink or toner on the paper-like material.

If a dot is not detected (step 606), new nanoparticle ink or toner is applied, sprayed, or treated to the ordinary paper-like material in the current position (step 609). Alternatively, a signal or field is applied to create a dot in the current position using existing nanoparticle ink or toner if step 603 was performed. If there are anymore dots to print or copy (step 610 and 611), the printer or copier head is moved to the next position and the process is repeated to print information line by line or pattern by pattern. If not, the print or copy operation is finished (step 612).

Although the examples given above are for rewritable or erasable printing or copying with nanoparticles, devices 230 or 315 may be configured to apply or remove nanoparticles, nanotubes, nanofibers, nanodots, nanocrystals, nanowires, or nanocomposites to a paper-like material. For example, a radio frequency identification (RFID) device may be selectively applied then removed by performing an erasing operation to a paper-like material.

Although features and elements are described above in particular combinations, each feature or element may be used alone without the other features and elements or in various combinations with or without other features and elements. The methods or flow charts provided herein may be implemented in a computer program, software, or firmware instructions incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method of erasable printing by a printing device, the method comprising:

applying nanoparticle toner and printing a dot by the printing device on plain paper; and erasing, subsequently, the dot by emitting a signal or field by the printing device to change an orientation of portions of the applied nanoparticle toner on the plain paper.

2. A printing device configured for erasable printing comprising:

the printing device configured to apply nanoparticle toner and print a dot on plain paper; and wherein the dot is subsequently erased by the printing device by emission of a signal or field to change an orientation of protions of the applied nanoparticle toner on the plain paper.

3. The method of claim 1 further comprising:

emitting, subsequently by the printing device, another signal or field to the portions of the applied nanoparticle toner on the plain paper to change a state to further erase the dot on the plain paper.

4. The method of claim 1 further comprising:

emitting, subsequently by the printing device, another signal or field to the portions of the applied nanoparticle toner on the plain paper to change an orientation to rewrite another dot on the plain paper.

5. The method of claim 1 further comprising:

emitting, subsequently by the printing device, another signal or field to the portions of the applied nanoparticle toner on the plain paper to change an orientation and remove the nanoparticle toner from the plain paper.

6. The method of claim 1 further comprising:

erasing pre-applied nanoparticle toner on the plain paper by the printing device.

7. The printing device of claim 2 further comprising:

the printing device configured to emit, subsequently, another signal or field to the portions of the applied nanoparticle toner on the plain paper to change a state to further erase the dot on the plain paper.

8. The printing device of claim 2 further comprising:

the printing device configured to emit, subsequently, another signal or field to the portions of the applied nanoparticle toner on the plain paper to change an orientation to rewrite another dot on the plain paper.

9. The printing device of claim 2 further comprising:

the printing device configured to emit, subsequently, another signal or field to the portions of the applied nanoparticle toner on the plain paper to change an orientation and remove the nanoparticle toner from the plain paper.

10. The printing device of claim 2 further comprising:

the printing device configured to erase pre-applied nanoparticle toner on the plain paper.

* * * * *